(12) United States Patent
Yu et al.

(10) Patent No.: US 8,976,094 B2
(45) Date of Patent: Mar. 10, 2015

(54) DISPLAY EDGE SEAL IMPROVEMENT

(75) Inventors: Cheng-Ho Yu, Cupertino, CA (US); Shih Chang Chang, Cupertino, CA (US); Youngbae Park, San Jose, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 887 days.

(21) Appl. No.: 13/101,680

(22) Filed: May 5, 2011

(65) Prior Publication Data

US 2012/0280957 A1    Nov. 8, 2012

(51) Int. Cl.
*G09G 3/36* (2006.01)
*G02F 1/1339* (2006.01)
*G02F 1/1333* (2006.01)

(52) U.S. Cl.
CPC .. *G02F 1/1339* (2013.01); *G02F 2001/133357* (2013.01); *G02F 2001/133388* (2013.01)
USPC ................ 345/87; 345/102; 345/211; 349/49

(58) Field of Classification Search
CPC ... G06F 3/04865; G06F 3/0487; G06F 3/044; G06F 3/04875; G06F 3/045
USPC .............. 345/87, 173–179, 102, 211; 349/49, 349/153
See application file for complete search history.

(56) References Cited

U.S. PATENT DOCUMENTS

| | | | |
|---|---|---|---|
| 6,803,983 B2 | 10/2004 | Kwak et al. | |
| 7,112,512 B2 | 9/2006 | Lan et al. | |
| 7,179,673 B2 * | 2/2007 | Song et al. | 438/30 |
| 7,643,114 B2 | 1/2010 | Lee et al. | |
| 7,760,281 B2 | 7/2010 | Tanabe et al. | |
| 2003/0090615 A1 * | 5/2003 | Park | 349/153 |
| 2004/0125314 A1 * | 7/2004 | Choi | 349/153 |
| 2006/0077334 A1 * | 4/2006 | Kim et al. | 349/153 |
| 2006/0258033 A1 | 11/2006 | Cheng et al. | |
| 2007/0262315 A1 | 11/2007 | Lee et al. | |
| 2008/0143912 A1 | 6/2008 | Kim | |
| 2008/0143949 A1 * | 6/2008 | Ino | 349/151 |

* cited by examiner

*Primary Examiner* — Kimnhung Nguyen

(57) ABSTRACT

Embodiments of the present disclosure relate to liquid crystal displays (LCDs) and electronic devices incorporating LCDs having an organic passivation layer positioned between edge-sealed two substrates. Specifically, embodiments of the present disclosure employ lithographic techniques (e.g., a half-tone mask, diffractive exposure mask, etc.) to remove or not deposit a portion of the organic passivation layer near the edges of the substrates prior to sealing the substrates along these edges. As described herein, this reduction in the thickness of the organic layer near the edges of the device may improve the strength of the edge seal due to reduced strain in the organic layer.

24 Claims, 5 Drawing Sheets

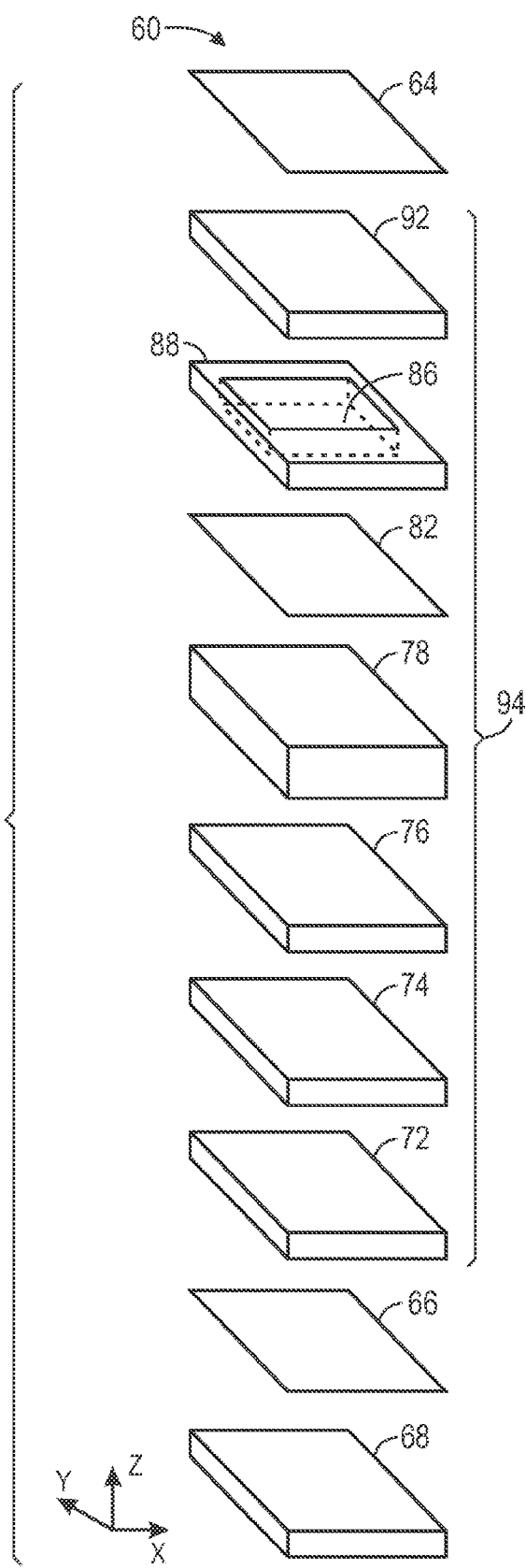

DISPLAY EDGE SEAL IMPROVEMENT

BACKGROUND

The present disclosure relates generally to electronic display panels, such as liquid crystal displays.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery-powered devices or in other contexts where it is desirable to minimize power usage.

During LCD fabrication, a thin film of organic molecules may serve as a passivation (i.e., insulating) layer between substrates, and the substrates may subsequently be sealed together along their edges using an adhesive sealant. However, the mechanical properties (e.g., strength) of the organic layer may be relatively weak and the adhesion of the sealant to an organic passivation layer may be poor. As a result, the edge seal may be susceptible to breakage due to high levels of strain at the interface between the organic passivation layer and the edge sealant. Poor edge sealing may lead to device failure (e.g., leakage of the liquid crystal layer) and, thereby, lower device yields and increase manufacturing costs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to liquid crystal displays (LCDs) and electronic devices incorporating LCDs having an organic passivation layer positioned between edge-sealed two substrates. Specifically, embodiments of the present disclosure employ lithographic techniques (e.g., a half-tone mask, diffractive exposure mask, etc.) to remove or not deposit a portion of the organic passivation layer near the edges of the substrates prior to sealing the substrates along these edges. As described herein, this reduction in the thickness of the organic layer near the edges of the device may improve the strength of the edge seal due to reduced strain in the organic layer.

By way of example, some embodiments utilize a half-tone mask and a positive-type organic passivation layer, or utilize a different half-tone mask and a negative-type organic passivation layer, to realize the thinning of the organic layer near the edges of the device. Use of a half-tone mask, or similar lithographic technique, allows the edge thickness of the organic layer to be precisely controlled over a wide range of thickness values. By making a thinner organic layer in the edge sealant area, the mechanical stress level at the seal may be reduced, thus increasing the strength of the seal.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 4 is an exploded view of layers of a pixel of an LCD panel, in accordance with aspects of the present disclosure;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, during LCD fabrication, multiple substrates may be stacked atop one another to form various layers of the device. When two substrates are stacked, it may be desirable to control the electrical and mechanical properties at the interface between the substrates. However, some materials may exhibit desirable electrical properties as well as less desirable mechanical properties. For example, an organic passivation layer may provide a good quality electrically insulating barrier between two substrates. However, when the two substrates are adhered to one another, the poor mechanical properties of the organic layer may cause the seal between the substrates to fail, allowing the substrates to separate. One solution is to control the dimensions of an organic passivation layer, especially near the edges of the device where the two substrates are typically sealed together. As described herein, controlling the edge thickness of the organic passivation layer may improve the mechanical properties at the interface between the organic layer and the adhesive seal and, thereby, improve the strength of the edge seal while still maintaining the desired electrically insulated interface between the two substrates.

Figure 1:
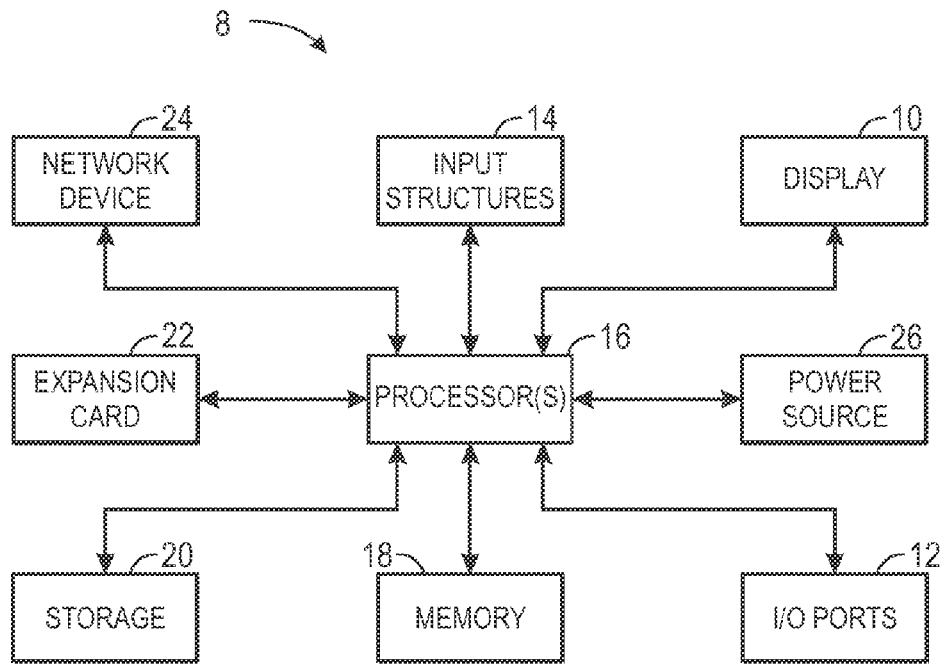
FIG. 1 is a block diagram of components of an example of an electronic device, in accordance with aspects of the present disclosure.
Figure 3:
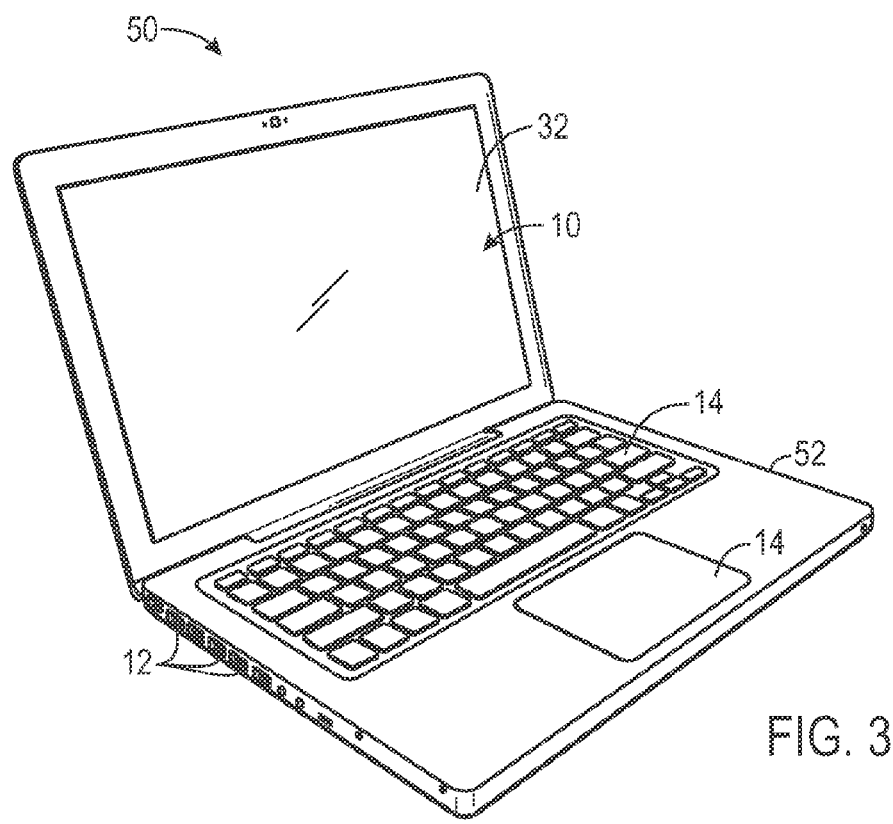
FIG. 3 is a view of an example of a computer, in accordance with aspects of the present disclosure.
Figure 2:
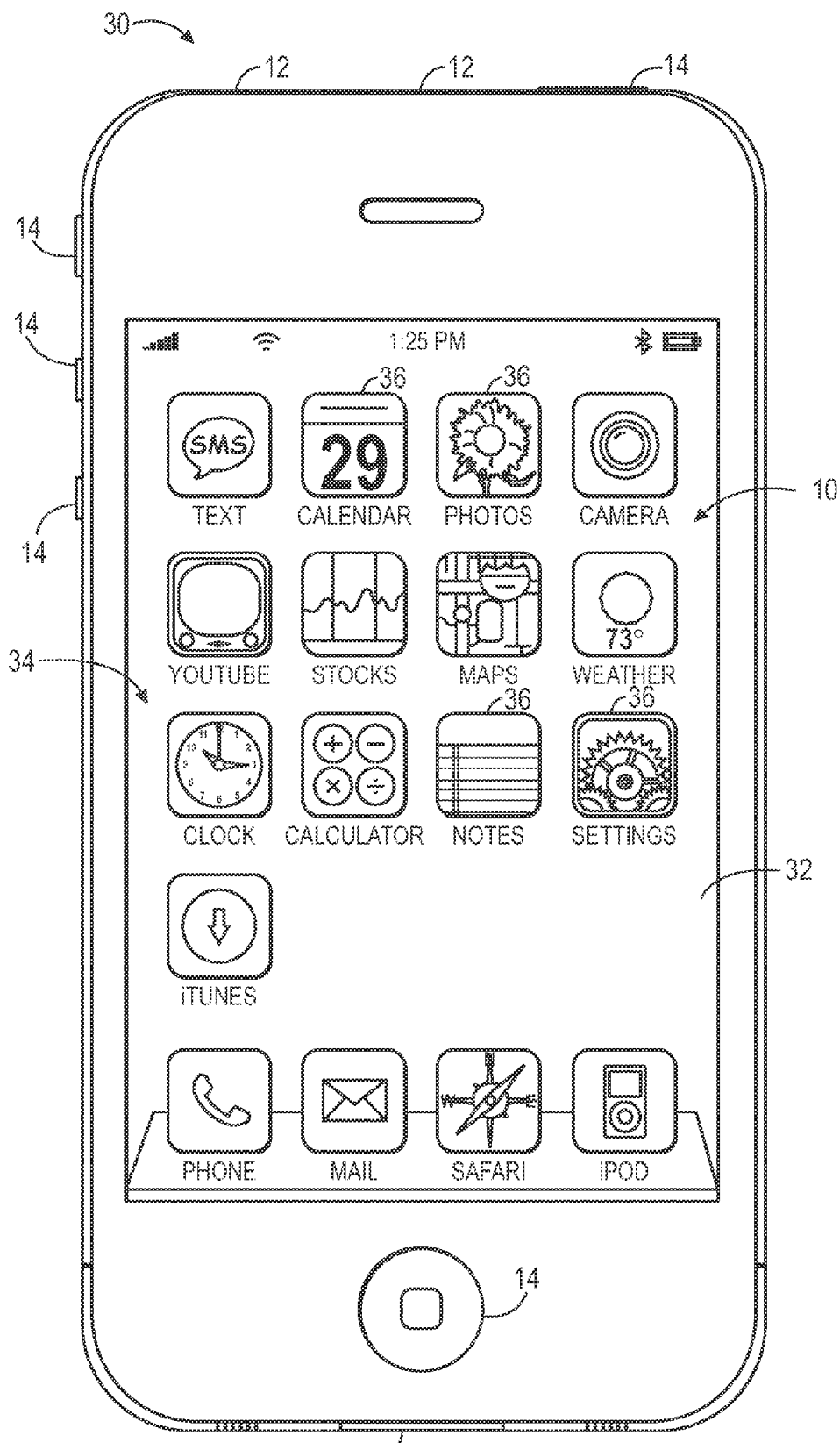
FIG. 2 is a front view of an example of a handheld electronic device, in accordance with aspects of the present disclosure.

With the foregoing in mind, a general description of suitable electronic devices that may employ such edge-thinned organic passivation layers will be provided below. In particular, FIG. 1 is a block diagram depicting various components that may be present in an electronic device suitable for use with such a display. FIGS. 2 and 3 respectively illustrate perspective and front views of suitable electronic devices, which may be, as illustrated, a notebook computer or a handheld electronic device.

An example of a suitable electronic device may include various internal and/or external components that contribute to the function of the device. FIG. 1 is a block diagram illustrating the components that may be present in such an electronic device 8 and may allow the device 8 to function. One of ordinary skill in the art will appreciate that the various functional blocks shown in FIG. 1 may comprise hardware elements (including circuitry), software elements (including computer code stored on a computer-readable medium), or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, one or more processors 16, a memory device 18, a non-volatile storage 20, expansion card(s) 22, a networking device 24, and a power source 26.

With regard to each of these components, the display 10 may be used to display various images generated by the device 8. The electronic device 8 includes a liquid crystal display (LCD) 10 that may utilize an edge-thinned organic passivation layer, such as described herein. Also, the display 10 may be an LCD employing, for example, fringe field switching (FFS), in-plane switching (IPS), or other techniques useful in operating such LCD devices. Additionally, in certain embodiments of the electronic device 8, the display 10 may be provided in conjunction with a touch-sensitive element, such as a touchscreen, that may be used as part of the control interface for the device 8.

The I/O ports 12 may include ports configured to connect to a variety of external devices, such as a power source, headset or headphones, or other electronic devices (such as handheld devices and/or computers, printers, projectors, external displays, modems, docking stations, and so forth). The I/O ports 12 may support any interface type, such as a universal serial bus (USB) port, a video port, a serial connection port, an IEEE-1394 port, an Ethernet or modem port, and/or an AC/DC power connection port.

The input structures 14 may include the various devices, circuitry, and pathways by which user input or feedback is provided to the processor 16. Such input structures 14 may be configured to control a function of the device 8, applications running on the device 8, and/or any interfaces or devices connected to or used by the electronic device 8. For example, the input structures 14 may allow a user to navigate a displayed user interface or application interface. Examples of the input structures 14 may include buttons, sliders, switches, control pads, keys, knobs, scroll wheels, keyboards, mice, touchpads, internal accelerometers, and so forth.

In certain embodiments, an input structure 14 and display 10 may be provided together, such as in the case of a touchscreen where a touch sensitive mechanism is provided in conjunction with the display 10. In such embodiments, the user may select or interact with displayed interface elements via the touch sensitive mechanism. In this way, the displayed interface may provide interactive functionality, allowing a user to navigate the displayed interface by touching the display 10.

User interaction with the input structures 14, such as to interact with a user or application interface displayed on the display 10, may generate electrical signals indicative of the user input. These input signals may be routed via suitable pathways, such as an input hub or bus, to the processor(s) 16 for further processing.

The processor(s) 16 may provide the processing capability to execute the operating system, programs, user and application interfaces, and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more reduced instruction set (RISC) processors, as well as graphics processors, video processors, audio processors and/or related chip sets.

The instructions or data to be processed by the processor(s) 16 may be stored in a computer-readable medium, such as a memory 18. Such a memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware for the electronic device 8 (such as a basic input/output instruction or operating system instructions), various programs, applications, or routines executed on the electronic device 8, user interface functions, processor functions, and so forth. In addition, the memory 18 may be used for buffering or caching during operation of the electronic device 8.

The components may further include other forms of computer-readable media, such as a non-volatile storage 20, for persistent storage of data and/or instructions. The non-volatile storage 20 may include flash memory, a hard drive, or any other optical, magnetic, and/or solid-state storage media. The non-volatile storage 20 may be used to store firmware, data files, software, hardware configuration information, and any other suitable data.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable connector, and may be accessed internally or external to the housing of the electronic device 8. For example, in one embodiment, the expansion card 22 may be a flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard or any other suitable wireless networking standard. The network device 24 may allow the electronic device 8 to communicate over a network, such as a Local Area Network (LAN), Wide Area Network (WAN), or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery or other type of suitable battery. The battery may be user-removable or may be secured within the housing of the electronic device 8 and may be rechargeable. Additionally, the power source 26 may include AC power, such as provided by an electrical outlet, and the electronic device 8 may be connected to the power source 26 via a power adapter. This power adapter may also be used to recharge one or more batteries, if present.

With the foregoing in mind, FIG. 2 illustrates an electronic device 8 in the form of a handheld device 30, here a cellular telephone. It should be noted that while the depicted handheld device 30 is provided in the context of a cellular telephone, other types of handheld devices (such as media players for playing music and/or video, personal data organizers, handheld game platforms, handheld GPS navigation units, and/or combinations of such devices) may also be suitably provided as the electronic device 8. Further, a suitable handheld device 30 may incorporate the functionality of one or more types of devices, such as a media player, a cellular phone, a gaming platform, a personal data organizer, and so forth.

For example, in the depicted embodiment, the handheld device 30 is in the form of a cellular telephone that may provide various additional functionalities (such as the ability to take pictures, record audio and/or video, listen to music, play games, map travel routes, and so forth). As discussed with respect to the general electronic device of FIG. 1, the handheld device 30 may allow a user to connect to and communicate through the Internet or through other networks, such as local or wide area networks. The handheld electronic device 30, may also communicate with other devices using short-range connections, such as Bluetooth and near field communication. By way of example, the handheld device 30 may be a model of an iPod®, iPhone®, or iPad® available from Apple Inc. of Cupertino, Calif.

In the depicted embodiment, the handheld device 30 includes an enclosure or body that protects the interior components from physical damage and shields them from electromagnetic interference. The enclosure may be formed from any suitable material such as plastic, metal, or a composite material and may allow certain frequencies of electromagnetic radiation to pass through to wireless communication circuitry within the handheld device 30 to facilitate wireless communication.

In the depicted embodiment, the enclosure includes user input structures 14 through which a user may interface with the device. Each user input structure 14 may be configured to help control a device function when actuated. For example, in a cellular telephone implementation, one or more of the input structures 14 may be configured to invoke a "home" screen or menu to be displayed, to toggle between a sleep and a wake mode, to silence a ringer for a cell phone application, to increase or decrease a volume output, and so forth.

In the depicted embodiment, the handheld device 30 includes a display 10 in the form of an LCD 32 that may utilize the edge-thinned organic passivation layer, as disclosed herein. The LCD 32 may be used to display a graphical user interface (GUI) 34 that allows a user to interact with the handheld device 30. The GUI 34 may include various layers, windows, screens, templates, or other graphical elements that may be displayed in all, or a portion, of the LCD 32. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touchscreen included in the display 10, or may be selected by a user input structure 14, such as a wheel or button.

The handheld electronic device 30 also may include various input and output (I/O) ports 12 that allow connection of the handheld device 30 to external devices. For example, one I/O port 12 may be a port that allows the transmission and reception of data or commands between the handheld electronic device 30 and another electronic device, such as a computer. Such an I/O port 12 may be a proprietary port from Apple Inc. or may be an open standard I/O port.

In addition to handheld devices 30, such as the depicted cellular telephone of FIG. 2, an electronic device 8 may also take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 8 in the form of a computer may be a model of a MacBook®, MacBook® Pro, MacBook Air®, iMac®, Mac® mini, or Mac Pro® available from Apple Inc. By way of example, an electronic device 8 in the form of a laptop computer 50 is illustrated in FIG. 3, in accordance with one embodiment of the present disclosure. The depicted computer 50 includes a housing 52, a display 10 (such as the depicted LCD 32), input structures 14, and input/output ports 12.

In one embodiment, the input structures 14 (such as a keyboard and/or touchpad) may be used to interact with the computer 50, such as to start, control, or operate a GUI or applications running on the computer 50. For example, a keyboard and/or touchpad may allow a user to navigate a user interface or application interface displayed on the LCD 32.

As depicted, the electronic device 8 in the form of computer 50 may also include various input and output ports 12 to allow connection of additional devices. For example, the computer 50 may include an I/O port 12, such as a USB port, Thunderbolt® port, or other port, suitable for connecting to another electronic device, a projector, a supplemental display, and so forth. In addition, the computer 50 may include network connectivity, memory, and storage capabilities, as described with respect to FIG. 1. As a result, the computer 50 may store and execute a GUI and other applications.

With the foregoing discussion in mind, it may be appreciated that an electronic device 8 in the form of either a handheld device 30 or a computer 50 may be provided with an LCD 32 as the display 10, which may utilize the edge-thinned organic passivation layer disclosed herein. Such an LCD 32 may be utilized to display the respective operating system and application interfaces running on the electronic device 8 and/or to display data, images, or other visual outputs associated with an operation of the electronic device 8.

In embodiments in which the electronic device 8 includes an LCD 32, the LCD 32 may include an array or matrix of picture elements (i.e., pixels). In operation, the LCD 32 generally operates to modulate the transmission of light through the pixels by controlling the orientation of liquid crystal disposed at each pixel. In general, the orientation of the liquid crystals is controlled by a varying an electric field associated with each respective pixel, with the liquid crystals being oriented at any given instant by the properties (strength, shape, and so forth) of the electric field.

Different types of LCDs may employ different techniques in manipulating these electrical fields and/or the liquid crystals. For example, certain LCDs employ transverse electric field modes in which the liquid crystals are oriented by applying an in-plane electrical field to a layer of the liquid crystals. Example of such techniques include in-plane switching (IPS) and fringe field switching (FFS) techniques, which differ in the electrode arrangement employed to generate the respective electrical fields.

While control of the orientation of the liquid crystals in such displays may be sufficient to modulate the amount of light emitted by a pixel, color filters may also be associated with the pixels to allow specific colors of light to be emitted by each pixel. For example, in embodiments where the LCD 32 is a color display, each pixel of a group of pixels may correspond to a different primary color. For example, in one embodiment, a group of pixels may include a red pixel, a green pixel, and a blue pixel, each associated with an appropriately colored filter. The intensity of light allowed to pass through each pixel (by modulation of the corresponding liquid crystals), and its combination with the light emitted from other adjacent pixels, determines what color(s) are perceived by a user viewing the display. As the viewable colors are formed from individual color components (e.g., red, green, and blue) provided by the colored pixels, the colored pixels may also be referred to as unit pixels.

With the foregoing in mind, and turning once again to the figures, FIG. 4 depicts an exploded view of different layers of a pixel of an LCD 32. The pixel 60 includes an upper polarizing layer 64 and a lower polarizing layer 66 that polarize light emitted by a backlight assembly 68 or light-reflective surface. A lower substrate 72 is disposed above the polarizing layer 66 and is generally formed from a light-transparent material, such as glass, quartz, and/or plastic.

A thin film transistor (TFT) layer 74 is depicted as being disposed above the lower substrate 72. For simplicity, the TFT layer 74 is depicted as a generalized structure in FIG. 4. In practice, the TFT layer may itself comprise various conductive, non-conductive, and semiconductive layers and structures which generally form the electrical devices and pathways which drive operation of the pixel 60. For example, in an embodiment in which the pixel 60 is part of an FFS LCD panel, the TFT layer 74 may include the respective data lines, scanning or gate lines, pixel electrodes, and common electrodes (as well as other conductive traces and structures) of the pixel 60. Such conductive structures may, in light-transmissive portions of the pixel, be formed using transparent conductive materials, such as indium tin oxide (ITO). In addition, the TFT layer 74 may include insulating layers (such as a gate insulating film) formed from suitable transparent materials (such as silicon oxide) and semiconductive layers formed from suitable semiconductor materials (such as amorphous silicon). The TFT layer 74 may also include an alignment layer (formed from polyimide or other suitable materials) at the interface with the liquid crystal layer 78.

The organic passivation layer 76 may be deposited on top of the TFT layer 74. For example, the organic passivation layer may be a polymer (e.g., poly(methyl methacrylate), poly(methyl glutarimide), SU-8, etc.), a resin (e.g., a phenol formaldehyde resin, DNQ/Novolac, etc.), or a similar photo-resist material. The organic passivation layer may be deposited by means of spin coating, slot coating, chemical vapor deposition (CVD), solution-based self-assembly, or similar technique. Additionally, the organic passivation layer 76 may be patterned using lithographic techniques, such as the half-tone mask processing described in detail below. The organic passivation layer may, among other things, serve as an electrically insulating barrier between the circuitry of the TFT layer 74 and the liquid crystal layer 78.

The liquid crystal layer 78 includes liquid crystal particles or molecules suspended in a fluid or gel matrix. The liquid crystal particles may be oriented or aligned with respect to an electrical field generated by the TFT layer 74. The orientation of the liquid crystal particles in the liquid crystal layer 78 determines the amount of light transmission through the pixel 60. Thus, by modulation of the electrical field applied to the liquid crystal layer 78, the amount of light transmitted though the pixel 60 may be correspondingly modulated.

Disposed on the other side of the liquid crystal layer 78 from the TFT layer 74 may be one or more alignment and/or overcoating layers 82 interfacing between the liquid crystal layer 78 and an overlying color filter 86. The color filter 86, in certain embodiments, may be a red, green, or blue filter, such that each pixel 60 corresponds to a primary color when light is transmitted from the backlight assembly 68 through the liquid crystal layer 78 and the color filter 86.

The color filter 86 may be surrounded by a light-opaque mask or matrix, e.g., a black mask 88 which circumscribes the light-transmissive portion of the pixel 60. For example, in certain embodiments, the black mask 88 may be sized and shaped to define a light-transmissive aperture over the liquid crystal layer 78 and around the color filter 86 and to cover or mask portions of the pixel 60 that do not transmit light, such as the scanning line and data line driving circuitry, the TFT, and the periphery of the pixel 60. In the depicted embodiment, an upper substrate 92 may be disposed between the black mask 88 and color filter 86 and the polarizing layer 64. In such an embodiment, the upper substrate 92 may be formed from light-transmissive glass, quartz, and/or plastic.

In the illustrated embodiment, the lower substrate 72 and the upper substrate 92 may be edge-sealed 94 to one another so as to contain the intervening layers. More specifically, the TFT layer 74, organic passivation layer 76, liquid crystal layer 78, overcoating layer 82, color filter 86, and black mask 88 may be interposed between the upper 92 and lower 72 edge-sealed substrates. The edge sealing of the upper 92 and lower 72 substrates may prevent, for example, leakage of the liquid crystal layer 78 from the edges of the device.

Figure 5:
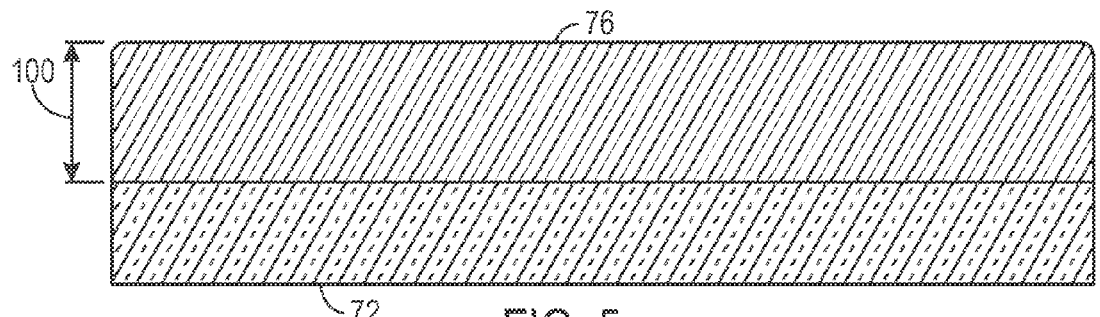
FIG. 5 is a side view of an organic passivation layer, in accordance with aspects of the present disclosure.

To better illustrate the edge sealing process, embodiments depicted in FIGS. 5-10 illustrate side views demonstrating steps involved in the deposition and patterning of an organic passivation layer 76 as well as the formation of the edge seal 94 between the upper 92 and lower 72 substrates. Turning first to FIG. 5, an organic passivation layer 76 may be deposited onto the lower substrate 72, on top of the TFT layer 74 (not shown). The organic layer may be deposited, grafted, or grown on top of the lower substrate 72 using one of the methods described above to form an organic passivation layer 76 having a particular thickness 100. More specifically, the organic passivation layer may have a thickness 100, such as 1 µm, 2 µm, 3 µm, 4 µm, 5 µm, or 6 µm, suitable to provide the desired level of electrical insulation.

In order to improve the mechanical properties of the sealed device, the thickness 100 of the organic passivation layer 76 may be reduced near the edges, which will eventually be in contact with the adhesive seal. These edge regions may have their thicknesses reduced by between 25% and 75%, for example, using the lithographic techniques discussed below. In some cases, the amount of edge thinning performed may depend, at least in part, in the original thickness 100 of the organic layer 76. That is, a thinner organic layer may receive less edge thinning than a thicker organic layer. For example, a thicker organic layer 76 (e.g., 4 µm-6 µm) may have its edge thickness reduced to between 50% and 75% the original thickness 100 of the organic layer 76. In contrast, for example, a relatively thinner organic layer 76 (e.g., 3 µm-4 µm) may have its edge thinned to between 25% and 50% the original thickness 100 of the organic layer 76. For an organic passivation layer 76 having an average thickness 100, the edge region may be thinned 40% to 60%, e.g., to approximately 50% of the original thickness 100 of the organic layer 76. It should be appreciated that while an organic passivation layer 76 having progressively thinner edges may yield improved mechanical properties after the edge sealing process (as described in detail below), thinner organic passivation layers may also result in diminished electrical insulation. As such, an optimized edge thickness represents a compromise between maximizing of the desired mechanical and electrical properties of the organic passivation layer 76 near these edges. For example, an organic passivation layer having a thickness of approximately 3 µm may handle push test forces between 6.8-6.9 N while experiencing between 4-5% peeling. In contrast, an organic passivation layer having a thickness of approximately 2.5 µm may handle push test forces between 7.0-7.6 N while experiencing between 0-1% peeling. If the electrical insulating properties of the two films are substantially similar, the 2.5 µm thick organic passivation layer may be selected for its superior mechanical properties.

Figure 6:
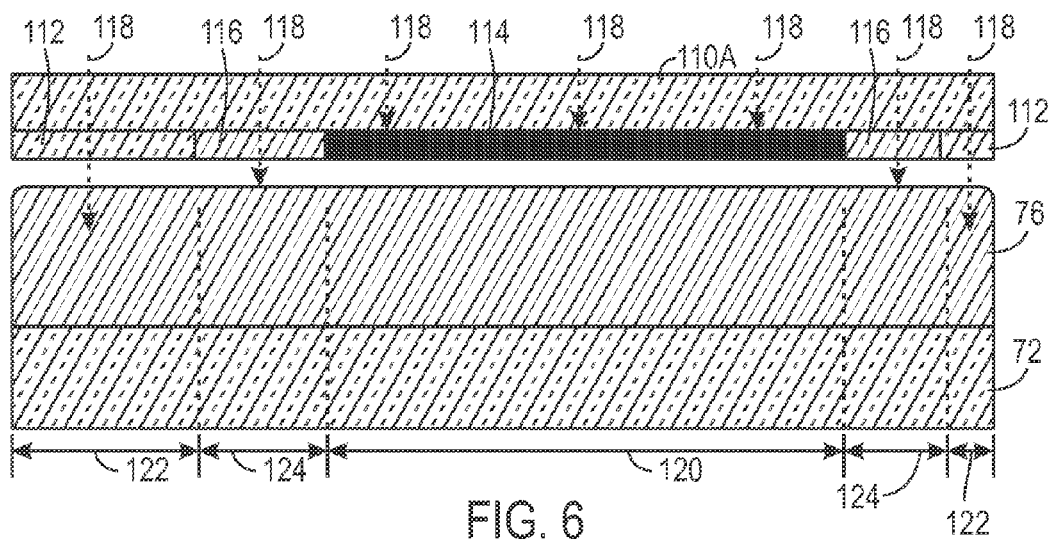
FIG. 6 is a side view of half-tone mask processing for a positive-type organic passivation layer, in accordance with aspects of the present disclosure.

After deposition, the organic passivation layer 76 may be patterned and thinned at the edges using different lithographic techniques. For example, FIG. 6 illustrates an embodiment where the deposited organic passivation layer 76 behaves as a positive-type photoresist layer. In the illustration, the organic passivation layer 76 is placed beneath a photolithography mask 110A having portions that are transparent 112, opaque 114, and partially opaque 116 (e.g., halftone). For a positive-type organic layer 76, the portions of the organic layer 76 that are exposed to light 118 are weakened during light 118 exposure due to photolytic cleavage of chemical bonds (and possibly the release of degrading agents such as acids or free-electrons) within the organic passivation layer 76. After exposure, a rinsing step follows using a developer, which is a solvent or a solution, such as an acid or base, that may be selected based upon the type of organic layer employed. During this rinsing step, the portions of the organic passivation layer 76 that have been degraded (i.e., rendered soluble in the developer) by light 118 exposure may partially or completely removed from the remainder of the structure that was shielded from the light 118 by the opaque portions 114 of the mask 110A.

As illustrated, the portion 120 of the organic passivation layer 76 positioned directly below the opaque portion 114 of the photolithography mask 110A receives no light 118 during exposure and, therefore, may not change in thickness after exposure and rinsing. By contrast, portions 122 of the organic passivation layer 76 located beneath transparent portions 112 of the mask 110A may be completely degraded by the transmitted light 118 during exposure and, therefore, may be completely removed after exposure and rinsing. The half-tone portions 116 of the mask 110A only transmit some of the light 118 to the portions 124 of the organic layer 76 beneath. Therefore, the amount of light 118 that the half-tone portions 116 of the mask 110A transmit determines how much these portions 124 will be thinned after exposure and rinsing.

Figure 7:
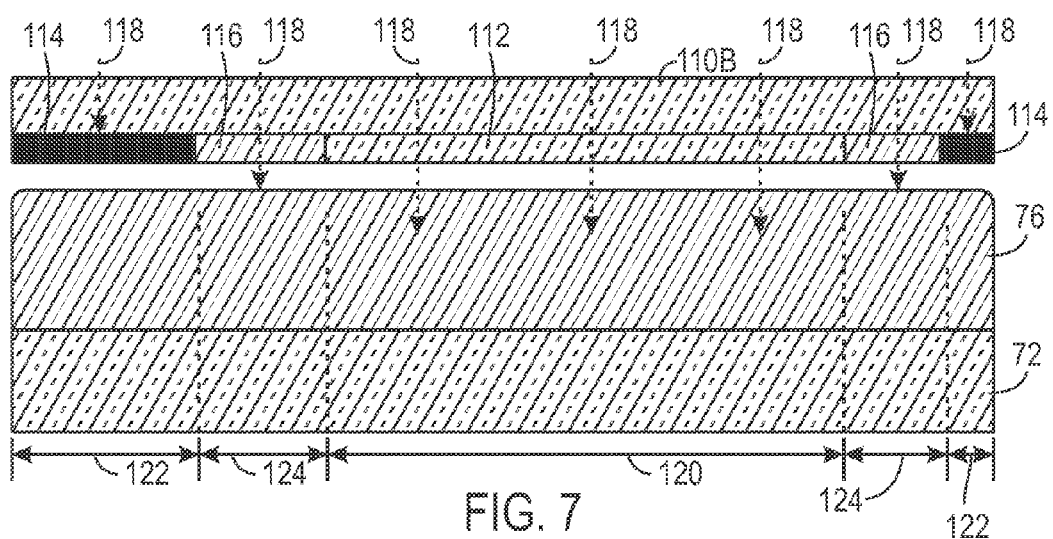
FIG. 7 is a side view of half-tone mask processing for a negative-type organic passivation layer, in accordance with aspects of the present disclosure.

Another method of thinning the organic passivation layer 76 at the edges is depicted in the embodiment of FIG. 7. Like FIG. 6, FIG. 7 illustrates an organic passivation layer 76 located beneath a photolithography mask 110B having portions that are transparent 112, opaque 114, and partially opaque 116 (e.g., half-tone); however, the embodiment depicted in FIG. 7 utilizes an organic layer 76 that behaves as a negative-type photoresist layer. For a negative-type organic layer 76, the portions of the organic layer 76 that are exposed to light are reinforced, such as by photochemical cross-linking of the molecules and/or polymers within the organic passivation layer 76. As such, following light exposure, when the device is exposed to a developer (e.g., an appropriately selected solvent, solution, acid, or base), only the portions of the organic passivation layer 76 that have received light 118 during the exposure will remain intact (i.e., insoluble in the developer).

For example, the portion 120 of the organic layer 76 beneath the transparent portion 112 of the photolithography mask 110B may be thoroughly irradiated during light 118 exposure and, therefore, may remain intact/insoluble during rinsing. In contrast, due to the lack of transparency, the portions 122 of the organic layer 76 positioned below the opaque portions 114 of the mask 110B may not be irradiated and, therefore, may be completely removed during rinsing. The half-tone portions 116 of the mask 110B may allow some of the incident light to be transmitted to underlying portions 124 of the organic layer 76, which will partially reinforce these portions 124 of the organic layer 76, and rising will result in a partially reduced thickness of the organic layer 76 in these regions 124.

Figure 8:
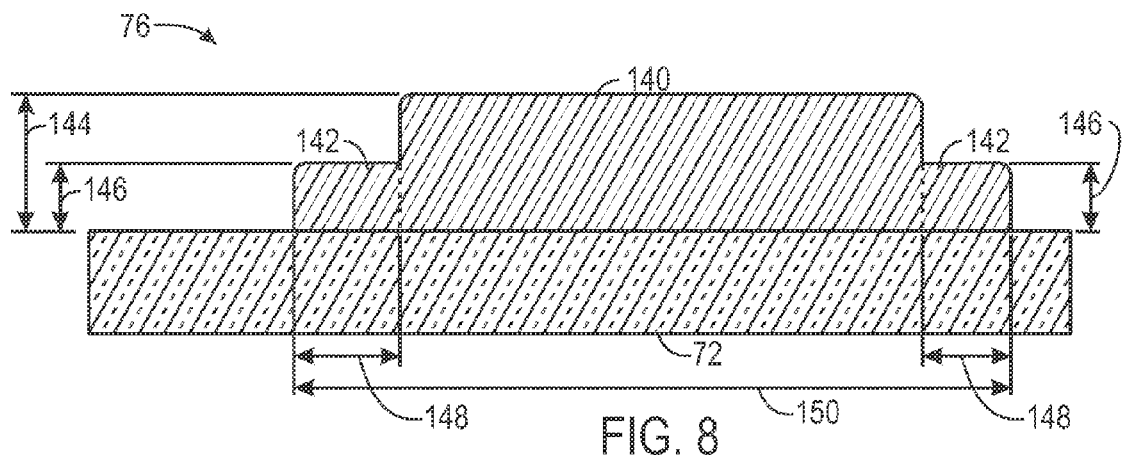
FIG. 8 is a side view of an organic passivation layer after an edge thinning process, in accordance with aspects of the present disclosure.

Accordingly, whether through the use of a positive- or negative-type organic passivation layer and the appropriate half-tone mask, or through some other similar lithographic technique, after removal of the of the undesired portions of the organic passivation layer 76, a structure may be attained resembling FIG. 8. In the embodiment of FIG. 8, the organic passivation layer 76 has a thicker portion 140 the middle and thinner portions 142 (i.e., shoulders) at the edges. Additionally, the width 148 of the shoulders 142 of the organic layer 76, as well as the width 150 of the entire organic layer 76, may be defined using, for example, the aforementioned lithographic processing.

Figure 9:
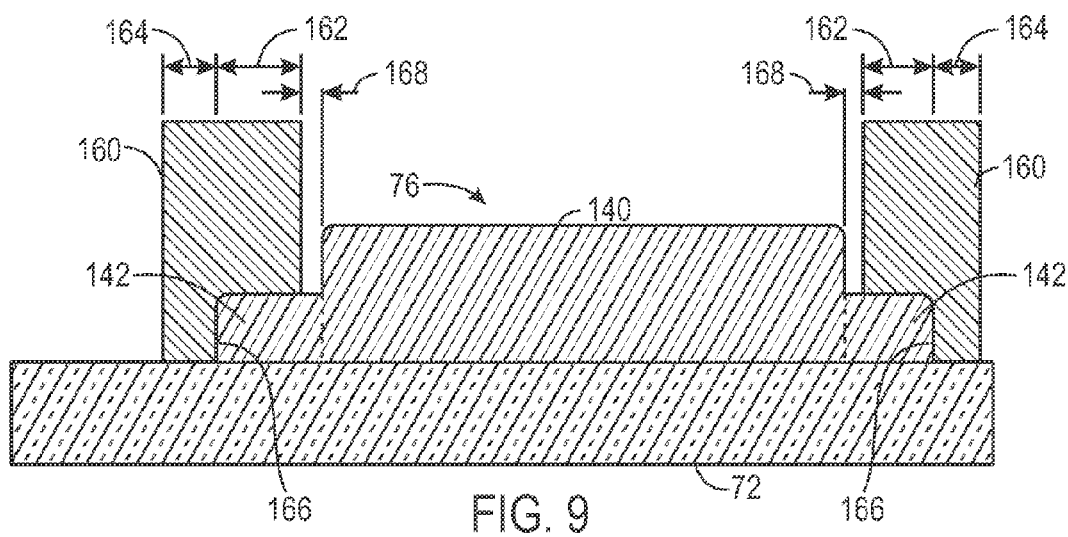
FIG. 9 is a side view of an edge-thinned organic passivation after the application of an adhesive sealant, in accordance with aspects of the present disclosure.

These shoulders 142 may serve as the point of contact between the organic passivation layer 76 and the edge sealant 160. For example, FIG. 9 depicts an embodiment of an edge-thinned organic passivation layer 76, like the embodiment of FIG. 8, with the addition of an adhesive sealing material 160 along the shoulders 142 of the organic layer 76. More specifically, the edge sealant 160 may cover a portion 162 of the shoulders 142 of the organic layer 76 and extend 164 beyond the outer edges 166 of the shoulders 142 to contact the lower substrate 72 beneath. Additionally, in some embodiments the edge seal 160 may not completely cover the shoulders 142 of the organic layer 76, which may yield a gap 168 between the edge sealant 160 and the thicker middle portion 140 of the organic layer 76. In another embodiment, the edge seal 160 may completely cover the shoulders 142 of the organic layer 76 and, as such, the sealant 160 may be flush with, or even overlap with, the thicker middle portion 140 of the organic layer 76.

Figure 10:
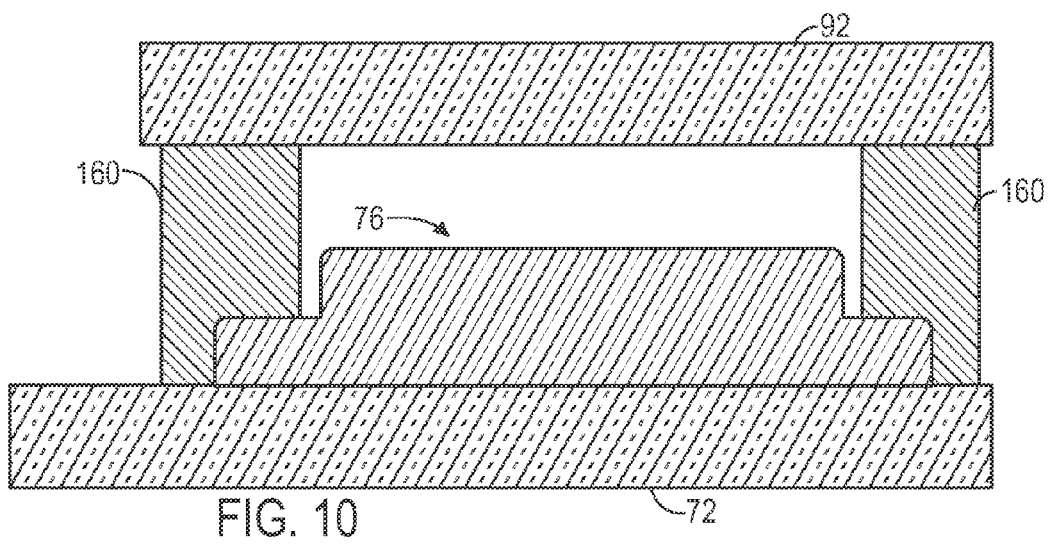
FIG. 10 is a side view of an edge-thinned organic passivation layer interposed between two edge-sealed substrates, in accordance with aspects of the present disclosure.

FIG. 10 depicts an embodiment of a device after an upper substrate 92 has been adhered to the lower substrate 72 and the organic passivation layer 76 using the edge sealant 160. In one embodiment, after the edge sealant is deposited (e.g., in the embodiment of FIG. 9), the layers (not shown) that may be interposed between the organic passivation layer 76 and the upper substrate 92 (e.g., liquid crystal layer 78, overcoating layer 82, color filter 86, and/or black mask 88) may be added on top of the organic passivation layer 76. In another embodiment, one or more of these intervening layers may instead be introduced on top of the organic passivation layer 76 before edge sealant 160 deposition, after which the sealant 160 may be deposited and the upper substrate 92 added to the structure. In another implementation, one or more of the intervening layers and the upper substrate 92 may be stacked on top of the organic passivation layer 76, and then the sealant 160 may be introduced between the upper 92 and lower 72 substrates from the edges of the device. In yet another embodiment, all of the intervening layers, except, for example, the liquid crystal layer, may be at least partially sealed between the upper 92 and lower 72 substrates by the edge sealant 160. In one such embodiment, the liquid crystal component may be introduced (e.g., injected, diffused, using capillary action, using a negative pressure, etc.) between the organic passivation layer 76 and the upper substrate 92 from an edge after the upper 92 and lower 72 substrates are at least partially sealed by the edge sealant 160.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A portion of an liquid crystal display (LCD) comprising:
    a first substrate;
    an organic passivation layer disposed on the first substrate, the organic passivation layer having a thicker middle portion and a thinner edge portion;
    an adhesive sealant disposed on the first substrate and the thinner edge portion of the organic passivation layer; and
    a second substrate disposed on the adhesive sealant, wherein the adhesive sealant is configured to seal the first substrate to the second substrate.

2. The portion of an LCD of claim 1, wherein the first substrate comprises a thin film transistor (TFT) layer and a transparent substrate.

3. The portion of an LCD of claim 1, comprising a liquid crystal layer interposed between the organic passivation layer and the second substrate.

4. The portion of an LCD of claim 1, wherein the organic passivation layer comprises a positive-type photoresist.

5. The portion of an LCD of claim 4, wherein the positive-type photoresist comprises poly(methyl methacrylate).

6. The portion of an LCD of claim 1, wherein the organic passivation layer comprises a negative-type photoresist.

7. The portion of an LCD of claim 6, wherein the negative-type photoresist comprises SU-8.

8. The portion of an LCD of claim 1, wherein the thinner edge portion is between 25% and 75% the thickness of the thicker middle portion.

9. The portion of an LCD of claim 8, wherein the thinner edge portion is between 50% and 75% the thickness of the thicker middle portion.

10. The portion of an LCD of claim 8, wherein the thinner edge portion is between 40% and 60% the thickness of the thicker middle portion.

11. A liquid crystal display (LCD) comprising:
    a LCD assembly comprising:
        a first transparent substrate;
        a thin film transistor (TFT) layer disposed on the first transparent substrate;
        an organic passivation layer disposed on the TFT layer, the organic passivation layer having a middle region and an edge region, the edge region being thinner than the middle region, the edge region defining a shoulder extending from the middle region;
        a liquid crystal layer disposed on the organic passivation layer;
        a second transparent substrate disposed on the liquid crystal layer; and
        a sealant disposed on the shoulder of the organic passivation layer and the sealant disposed about the edge region of the organic passivation layer to seal the organic passivation layer to the first substrate, the sealant also sealing the first substrate to the second substrate;
    a backlight assembly configured to emit light through the LCD assembly;
    control circuitry configured to control the operation of the TFT layer of the LCD assembly; and
    a housing assembly disposed about and configured to protect the LCD assembly, backlight assembly, and control circuitry.

12. The LCD of claim 11, wherein the organic passivation layer is a positive-type photoresist.

13. The LCD of claim 12, wherein the positive-type photoresist comprises poly(methyl methacrylate).

14. The LCD of claim 11, wherein the organic passivation layer is a negative-type photoresist.

15. The LCD of claim 14, wherein the negative-type photoresist comprises SU-8.

16. The LCD of claim 11, wherein the edge region is between 50% and 75% the thickness of the middle region.

17. The LCD of claim 16, wherein the edge region is between 25% and 50% the thickness of the middle region.

18. The LCD of claim 16, wherein the edge region is between 40% and 60% the thickness of the middle region.

19. An electronic device comprising:
    one or more input structures;

a storage structure encoding one or more executable routines;

a processor configured to receiving inputs from the one or more input structures and to execute the one or more executable routines; and a liquid crystal display (LCD) configured to present a user with visual information based upon the execution of the one or more executable routines, the LCD comprising:
   a LCD assembly comprising:
      a first transparent substrate;
      a thin film transistor (TFT) layer disposed on the first transparent substrate;
      an organic passivation layer disposed on the TFT layer, the organic passivation layer having a middle region and an edge region, the edge region being thinner than the middle region, the edge region defining a shoulder;
      a liquid crystal layer disposed on the organic passivation layer;
      a second transparent substrate disposed on the liquid crystal layer; and
      a sealant disposed on the lower substrate and disposed on the shoulder and about the edge region of the organic passivation layer to seal the organic passivation layer to the first substrate, the sealant also disposed between the first substrate and the second substrate to seal the first substrate to the second substrate;
   a backlight assembly configured to emit light through the LCD assembly; and
   control circuitry configured to control the operation of the TFT layer of the LCD assembly.

20. The electronic device of claim 19, wherein the edge region is between 50% and 75% the thickness of the middle region.

21. The electronic device of claim 20, wherein the edge region is between 25% and 50% the thickness of the middle region.

22. The electronic device of claim 20, wherein the edge region is between 40% and 60% the thickness of the middle region.

23. The electronic device of claim 19, wherein the organic passivation layer is a positive-type photoresist.

24. The electronic device of claim 19, wherein the organic passivation layer is a negative-type photoresist.

* * * * *